United States Patent
Pahontu

(10) Patent No.: US 10,217,006 B2
(45) Date of Patent: Feb. 26, 2019

(54) METHOD AND DEVICE FOR DETECTING OBJECTS IN THE DARK USING A VEHICLE CAMERA AND A VEHICLE LIGHTING SYSTEM

(71) Applicant: Continental Automotive GmbH, Hannover (DE)

(72) Inventor: Nicolae Pahontu, Campia Turzii (RO)

(73) Assignee: Continental Automotive GmbH, Hannover (DE)

( * ) Notice: Subject to any disclaimer, the term of this patent is extended or adjusted under 35 U.S.C. 154(b) by 108 days.

(21) Appl. No.: 15/236,992

(22) Filed: Aug. 15, 2016

(65) Prior Publication Data

US 2017/0061221 A1 Mar. 2, 2017

(30) Foreign Application Priority Data

Aug. 31, 2015 (EP) .................................... 15465533

(51) Int. Cl.
| | | |
|---|---|---|
| *H04N 7/18* | (2006.01) | |
| *H04N 5/232* | (2006.01) | |
| *G06K 9/00* | (2006.01) | |
| *G06K 9/20* | (2006.01) | |
| *H04N 5/235* | (2006.01) | |

(52) U.S. Cl.
CPC ..... *G06K 9/00805* (2013.01); *G06K 9/00791* (2013.01); *G06K 9/2027* (2013.01); *H04N 5/2354* (2013.01); *H04N 5/23229* (2013.01); *H04N 7/183* (2013.01)

(58) Field of Classification Search
CPC ................................................. G06K 9/00805
See application file for complete search history.

(56) References Cited

U.S. PATENT DOCUMENTS

| | | | | |
|---|---|---|---|---|
| 4,491,866 A | * | 1/1985 | Verhoeven | ........... H04N 5/3205 348/E5.089 |
| 6,748,105 B1 | * | 6/2004 | Mancuso | ............... G03B 35/00 382/154 |
| 7,113,867 B1 | * | 9/2006 | Stein | ......................... G06T 7/20 701/301 |

(Continued)

FOREIGN PATENT DOCUMENTS

| | | |
|---|---|---|
| DE | 102011116128 | 4/2013 |
| EP | 2172873 | 4/2010 |

(Continued)

OTHER PUBLICATIONS

Thompson, W.B., et al., "Detecting moving objects," Jan. 1, 1990, pp. 39-57, vol. 4, No. 1, International Journal of Computer Vision, Kluwer Academic Publishers, Norwell, US (abstract only).

(Continued)

*Primary Examiner* — Jayanti K Patel
*Assistant Examiner* — Irfan Habib
(74) *Attorney, Agent, or Firm* — RatnerPrestia

(57) ABSTRACT

A method and device for detecting objects in the dark using a vehicle camera and a vehicle lighting system. The method comprising: a) taking a first image with the vehicle lighting switched off; b) taking a second image with the vehicle lighting switched on; c) generating a differential image of the second and first images; and d) detecting reflective objects using the differential image.

12 Claims, 2 Drawing Sheets

(56) References Cited

U.S. PATENT DOCUMENTS

| | | | | |
|---|---|---|---|---|
| 7,983,802 | B2* | 7/2011 | Breed | G08G 1/161 180/169 |
| 8,233,031 | B2* | 7/2012 | Saito | G01C 3/08 348/47 |
| 8,280,194 | B2* | 10/2012 | Wong | G06K 9/209 345/660 |
| 8,412,449 | B2* | 4/2013 | Trepagnier | G01S 17/023 701/301 |
| 8,553,093 | B2* | 10/2013 | Wong | G06T 3/4069 348/208.13 |
| 8,564,712 | B2* | 10/2013 | Li | H04N 5/23212 348/345 |
| 8,587,456 | B2 | 11/2013 | Walter | |
| 8,593,521 | B2* | 11/2013 | Schofield | G06K 9/00818 348/148 |
| 8,706,394 | B2* | 4/2014 | Trepagnier | G01S 17/023 701/301 |
| 8,995,721 | B1* | 3/2015 | Fairfield | G06K 9/00825 340/988 |
| 9,066,085 | B2* | 6/2015 | Cluff | H04N 13/246 |
| 10,019,635 | B2* | 7/2018 | Kido | G01C 3/06 |
| 2005/0163343 | A1* | 7/2005 | Kakinami | G06K 9/00812 382/103 |
| 2008/0144924 | A1* | 6/2008 | Hoffmann | H04N 13/246 382/154 |
| 2008/0192984 | A1* | 8/2008 | Higuchi | G08G 1/16 382/104 |
| 2008/0266396 | A1* | 10/2008 | Stein | G06K 9/00805 348/148 |
| 2009/0122136 | A1* | 5/2009 | Shiraishi | B60R 1/00 348/135 |
| 2010/0172542 | A1* | 7/2010 | Stein | G06K 9/00798 382/103 |
| 2011/0074956 | A1 | 3/2011 | Faber | |
| 2012/0050074 | A1* | 3/2012 | Bechtel | B60R 1/04 340/988 |
| 2012/0123638 | A1* | 5/2012 | Bechtel | B60Q 1/1423 701/36 |
| 2012/0269382 | A1* | 10/2012 | Kiyohara | G01C 21/26 382/103 |
| 2013/0027511 | A1* | 1/2013 | Takemura | G06K 9/00798 348/42 |
| 2013/0088598 | A1* | 4/2013 | Muramatsu | G06K 9/2027 348/148 |
| 2013/0300872 | A1* | 11/2013 | Park | B60R 1/00 348/148 |
| 2014/0168377 | A1* | 6/2014 | Cluff | H04N 13/246 348/47 |
| 2014/0362193 | A1* | 12/2014 | Kanetake | G01S 1/00 348/50 |
| 2015/0042767 | A1* | 2/2015 | Ciurea | H04N 13/232 348/48 |
| 2015/0048738 | A1 | 2/2015 | Falb | |
| 2016/0014406 | A1* | 1/2016 | Takahashi | G06T 7/73 348/148 |
| 2016/0261848 | A1* | 9/2016 | Sekiguchi | B60R 1/00 |

FOREIGN PATENT DOCUMENTS

| | | |
|---|---|---|
| WO | 2009052788 | 4/2009 |
| WO | 2009143910 | 12/2009 |

OTHER PUBLICATIONS

European Search Report dated Feb. 25, 2016 for European Application No. 15465533.6, including partial translation, 8 pages.

* cited by examiner

METHOD AND DEVICE FOR DETECTING OBJECTS IN THE DARK USING A VEHICLE CAMERA AND A VEHICLE LIGHTING SYSTEM

CROSS REFERENCE TO RELATED APPLICATIONS

This application is claims priority to European Patent Application No. EP15465533, filed Aug. 31, 2015, the contents of such application being incorporated by reference herein.

FIELD OF THE INVENTION

The invention relates to a method and device for detecting objects in the dark using a vehicle camera and a vehicle lighting system.

BACKGROUND OF THE INVENTION

WO 2009143910 A1, which is incorporated by reference discloses a device for a motor vehicle which comprises a headlight for illuminating the surroundings of a motor vehicle and a camera for generating images of the surroundings of the motor vehicle. The camera and the headlight are synchronized such that the camera generates the images in dark phases of the headlight. Furthermore, a camera and a method for generating images are proposed.

EP 2172873 A2, which is incorporated by reference discloses a camera whose data is used for several driver assist functions. For fog detection, it is proposed that a light source is synchronized with image-taking such that a first image is taken with the light source switched on and a second image is taken with the light source switched off. The second image can be subtracted from the first image to detect a "halo" that occurs in foggy conditions.

WO 2009052788 A1, which is incorporated by reference discloses a method and device for distinguishing between reflectors and vehicle lights on the roadside and for identifying said reflectors and vehicle lights for use in an automatic light control system in a vehicle with a camera sensor oriented towards the surroundings of the vehicle. The position of a light spot in the camera image is used for said distinction based on a statistical map that shows the image areas in which predominantly vehicle lights or reflectors, respectively, can be expected.

US 2015048738 A1, which is incorporated by reference discloses a vehicle camera system and method for distinguishing reflective objects from the lights of other vehicles. When light sources are detected in a camera image, the vehicle's own exterior lighting is modulated and the system determines if the detected light sources follow this modulation pattern. If they do, these light sources are considered reflective objects. If not, the system outputs a signal that other vehicles are in the camera's field of view, and the vehicle's own high-beam light can be deactivated.

SUMMARY OF THE INVENTION

An aspect of the invention provides improved object detection based on vehicle camera image data in the dark.

A method according to an aspect of the invention for detecting objects using a vehicle camera and a vehicle lighting system comprises the following steps:
a) Taking a first image with the vehicle lighting switched off;
b) Taking a second image with the vehicle lighting switched on;
c) Generating a differential image of the second and first images; and
d) Detecting reflective objects using the differential image.

A mono camera, preferably with color resolution, a stereo camera, an all-round view camera system, or a combination of multiple said camera systems (also of systems of the same type) can be provided as vehicle camera.

It is preferred that one or multiple control units are provided for synchronizing the vehicle lighting and the image-taking periods of the vehicle camera. The vehicle lighting particularly includes headlights which illuminate the surroundings of the vehicle and which can for a short time be switched off and on again, either individually or in groups.

Steps c) and d) can advantageously be performed as part of image processing.

The communication required for the synchronization of switching the vehicle lights on and off can be via cables or wireless.

The first image of the vehicle camera only captures independently luminous light sources as well as objects illuminated by the same. The second image additionally captures reflective objects that are illuminated by the activated vehicle lighting. Especially reflective objects (retroreflectors) are detected particularly well, other objects reflect significantly less light of the vehicle lighting into the vehicle camera.

The differential image primarily contains reflective objects only. These objects can therefore be detected from the differential image and preferably also be identified. A multitude of reflective surfaces is used in road traffic to make driving in the dark easier. Since these are made for perception by the human eye, the vehicle camera can capture them very well.

An aspect of the invention has the advantage that all reflective objects captured by the camera can be well detected and identified in the dark.

Road and lane markings are often reflective: Lane separation lines (solid, dashed, Bott's dots), guard rails with reflector elements, guide posts. Sometimes these are marked in different colors for different sides or lane boundaries, which makes orientation in the dark easier.

Traffic signs are also typically retroreflective; switched-off traffic lights are reflective. It is also typical of these objects that they are stationarily arranged.

When a lane is sufficiently equipped with such reflective objects, the differential image can preferably be used to determine the further course of the road and lane, optionally to detect opportunities for passing or no passing zones, which is crucial for lane assist functions such as lane departure warning (LDW), lane keeping assist/system (LKA/LKS), or lane change assistants.

Other relevant objects that can advantageously be detected in the differential image due to their reflective properties are other road users or obstacles without an independent light source with reflectors. These can include a stationary vehicle with deactivated lighting, a cyclist without lights, a pedestrian or children with reflective clothing or satchels.

While road infrastructure reflectors typically have specific typical shapes, colors, courses and positions, other road users and obstacles can have a multitude of different reflector arrangements.

Apart from stationary obstacles, other road users can frequently be detected by their movement.

Advantageously, the color of the reflective objects can be determined from the differential image and taken into account for identification. In addition to color-specific road markings, e.g. for the left and right roadsides, red rear reflectors on bicycles or vehicles with switched-off lights, orange reflectors in bicycle pedals or spokes can be detected, which facilitates a more reliable identification of the respective objects. The color of traffic signs can also be well detected.

Vehicle cameras typically have a high sensitivity and a wide dynamic range. The exposure time of the first image can be selected or preset as short as possible to prevent disturbing effects of switching off the lights on the driver and other road users. Independently luminous light sources can also be detected with a short exposure time. In addition, shifts in the image due to movements (of one's own vehicle and of other road users), which can lead to artifacts in the differential image, are reduced. A short exposure time can be up to 10 ms, preferably only up to 5 ms.

To prevent or minimize the formation of artifacts in the differential image due to the movement of one's own vehicle or potentially of other road users between the taking of the first and second images, the ego-motion of one's own vehicle and thus of the vehicle camera and the movement of other road users can advantageously be taken into account.

For this purpose, image processing can be used to detect external light sources in the first image and to determine their position. Their position in the second image can be predicted based on ego-motion. One's own speed is a first decisive factor for ego-motion; in addition, one's own acceleration, yaw angle, yaw rate, etc. can be included in the prediction. Stationary light sources can be predicted well in this manner.

Preceding tracking of light sources in first images can indicate that there are moving external light sources (e.g. headlights of moving vehicles). Their prediction in a later second image can be improved by estimating the motion variables (speed, acceleration, yaw, pitch, roll angle or rate) or the motion vector.

An advantageous embodiment of the invention is the use of an all-round view camera system which as a vehicle camera advantageously comprises four or more individual cameras with a wide aperture angle. Advantageously, individual vehicle lights that cast light into the sensing range of an individual camera can then be switched off in a synchronized manner for image-taking.

Another aspect of the invention is a device for detecting objects in the dark using a vehicle camera and a vehicle lighting control system.

BRIEF DESCRIPTION OF THE DRAWINGS

Further exemplary embodiments of the invention are explained with reference to figures below.
Wherein.

DETAILED DESCRIPTION OF THE PREFERRED EMBODIMENTS

Figure 1:
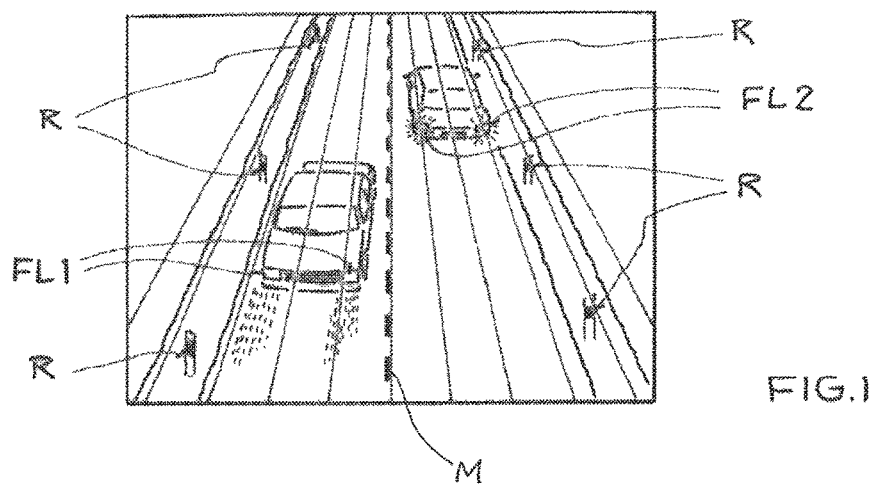
FIG. 1 is a schematic view of a driving situation.

FIG. 1 shows the complete situation which could be captured by the front camera (1) of a vehicle (5) if there is sufficient light. The camera image shows a road with a dashed median (M), an oncoming vehicle with headlights (FL1) on the left side and a vehicle moving in front with tail lights (FL2) on the right side and reflectors (R) arranged to the left and right on the roadside.

When it is dark and the lights (2, 4) of one's own vehicle (5) are switched on, only the vehicle lights and reflectors of the guide and road boundary posts can be seen as areas of light and a highly reflective median (M) is visible as a strip of light.

When one's own vehicle lighting (2, 4) is switched off, only the headlights (FL1) of the opposing vehicle and the tail lights (FL2) of the vehicle moving in front can be seen as areas of light.

Accordingly, a differential image would substantially represent the areas of light depicted by the reflectors (R) of the roadside guide posts and the reflective median (M) due to the reflection of one's own vehicle lighting. Likewise, areas of light resulting from reflective traffic signs on the roadside, unilluminated vehicle reflectors, bicycle reflectors, reflective clothing of individuals, etc. (not shown) would emerge in the differential image and help detect such objects in the dark.

Figure 2:
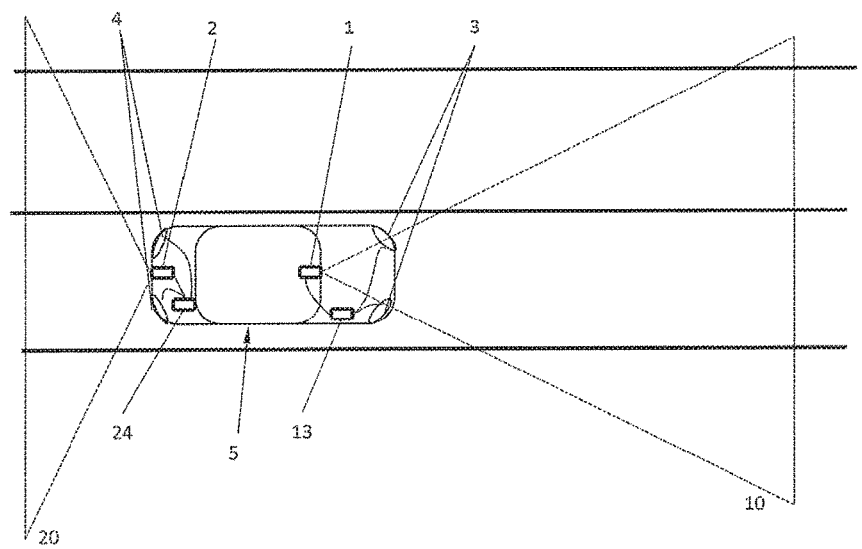
FIG. 2 shows a vehicle with a vehicle camera and vehicle lighting system.

FIG. 2 shows a vehicle (5) with a front vehicle camera (1) that covers a frontal area (10) and a rear vehicle camera (2) that covers a rearward area (20). The control of the headlights (3) can be switched off and back on by a front control unit (13) in a synchronized manner for taking an image with the front vehicle camera (1).

Likewise, the control of the tail lights (4) can be switched off and back on by a rear control unit (24) in a synchronized manner for taking an image with the rear vehicle camera (2).

In this way, a first image can be taken with headlights or tail lights, respectively, switched off using the front or rear camera, respectively, and a second image can be taken immediately thereafter with the respective vehicle lighting activated.

The invention claimed is:
1. A method for detecting objects in the dark, the method comprising:
   a) capturing, by a vehicle camera, a first image when a vehicle lighting is switched off;
   b) capturing, by the vehicle camera, a second image when the vehicle lighting is switched on;
   c) determining, by a vehicle processor, movement of the vehicle between capturing the first image and capturing the second image;
   d) predicting, by the vehicle processor, a position of an object in the second image based on a position of the object in the first image and the movement of the vehicle;
   e) generating, by the vehicle processor, a differential image of the second and first images based on the predicted position of the object in the second image; and
   f) distinguishing, by the vehicle processor, between lighting devices and reflective objects based on the differential image.

2. The method according to claim 1, wherein stationary reflective objects are detected using the differential images by multiple performance of the steps a) to f).

3. The method according to claim 2, wherein the course of the road lying ahead is estimated from the position and type of detected stationary reflective objects.

4. The method according to claim 1, further comprising estimating whether reflective objects can represent road users or obstacles without an independent light source.

5. The method according to claim 4, wherein non-stationary reflective objects are detected as road users.

6. The method according to claim 1, wherein the color of the reflective objects is determined and taken into account for detection.

7. The method according to claim 1, wherein an ego-motion of the vehicle is taken into account when generating the differential image by predicting the position of areas of light in the second image based on the position of said areas of light in the first image.

8. The method according to claim 1, wherein a movement of areas of light is determined from a sequence of first images and said movement is taken into account when generating the differential image from another first image and a subsequent second image.

9. The method according to claim 1, wherein the vehicle camera is an all-round view camera system.

10. A device for detecting objects in the dark using a vehicle camera and a vehicle lighting control unit comprising:
   a vehicle camera, configured for:
   a) capturing a first image when a vehicle lighting is switched off;
   b) capturing a second image when the vehicle lighting is switched on;
   c) determining movement of the vehicle between capturing the first image and capturing the second image;
   d) predicting a position of an object in the second image based on a position of the object in the first image and the movement of the vehicle; and
   an image processor, configured for:
   a) generating a differential image of the second and first images based on the predicted position of the object in the second image; and
   b) distinguishing between lighting devices and reflective objects based on the differential image.

11. The method according to claim 2, further comprising estimating whether reflective objects can represent road users or obstacles without an independent light source.

12. The method according to claim 3, further comprising estimating whether reflective objects can represent road users or obstacles without an independent light source.

* * * * *